(12) United States Patent
Cittadini et al.

(10) Patent No.: US 7,961,962 B2
(45) Date of Patent: Jun. 14, 2011

(54) METHOD, APPARATUS AND COMPUTER PROGRAM FOR HALFTONING DIGITAL IMAGES

(75) Inventors: Ferruccio Cittadini, Paris (FR); Jacques C. E. Pervillé, Fontenay Sous Bois (FR)

(73) Assignee: Oce-Techonologies B.V., Venlo (NL)

( * ) Notice: Subject to any disclaimer, the term of this patent is extended or adjusted under 35 U.S.C. 154(b) by 1217 days.

(21) Appl. No.: 11/637,700

(22) Filed: Dec. 13, 2006

(65) Prior Publication Data

US 2007/0133060 A1    Jun. 14, 2007

(30) Foreign Application Priority Data

Dec. 14, 2005    (EP) .................................. 05292673

(51) Int. Cl.
*G06K 9/36*    (2006.01)
(52) U.S. Cl. ...................................... 382/237
(58) Field of Classification Search .................. 382/235, 382/237; 358/3.06
See application file for complete search history.

(56) References Cited

U.S. PATENT DOCUMENTS

| 5,014,333 A | 5/1991 | Miller et al. |
| 2002/0181024 A1 | 12/2002 | Morimoto et al. |
| 2005/0046903 A1 | 3/2005 | Yoshida |

FOREIGN PATENT DOCUMENTS

| EP | 0544511 A2 | 11/1992 |
| EP | 0817466 A2 | 1/1998 |
| EP | 1646223 A1 | 4/2006 |

OTHER PUBLICATIONS

R. Floyd et al., An Adaptive Algorithm for Spatial Greyscale, pp. 75-77.

*Primary Examiner* — Duy M Dang
(74) *Attorney, Agent, or Firm* — Birch, Stewart, Kolasch & Birch, LLP

(57) ABSTRACT

A method for generating a halftone image includes the steps of, for each input pixel, adding a previously determined error term to the input pixel value to obtain a modified input pixel value; determining an error diffusion threshold level based on the input pixel value; applying a quantization operation to the modified input pixel value using the determined error diffusion threshold level for obtaining an output pixel value; and determining an error contribution. The error diffusion threshold level depends on a result of a comparison operation performed between the input pixel value and a threshold value selected from a set of threshold values, the selection of the threshold value being based on the position of the input pixel in the input image.

14 Claims, 4 Drawing Sheets

METHOD, APPARATUS AND COMPUTER PROGRAM FOR HALFTONING DIGITAL IMAGES

CROSS-REFERENCE TO RELATED APPLICATIONS

This nonprovisional application claims priority under 35 U.S.C. §119(a) on Patent Application No. 05292673.0, filed in the European Patent Office on Dec. 14, 2005, the entirety of which is incorporated herein by reference.

BACKGROUND OF THE INVENTION

1. Field of the Invention

The present invention relates to a method and apparatus for generating a halftone image. The present invention also relates to a computer program product for performing the method for generating a halftone image.

2. Description of Background Art

Digital halftoning is a technique employed in the field of image processing in order to generate a halftone output image from a continuous-tone image. Particularly, digital halftoning is used in printers with binary or limited level output such as inkjet printers and the like for enabling the printing of continuous-tone images such as 8-bit grey-scale images or 24-bit color-scale images. Common methods according to the background art for generating a multilevel halftone image include error diffusion and periodic dithering.

Halftoning based on error diffusion has become one of the most popular techniques for producing a halftone output image from a continuous-tone image. Particularly in the field of computerized images, wherein for example 8-bit grey scale or 24-bit color value images are common, error diffusion halftoning is used widely when halftoned images are to be printed using multilevel output printers. A binary output printer is an example of a multilevel output printer.

A method for generating a multilevel halftone image of the above type is known from EP 0544511 A2. The function that determines the error diffusion threshold level is the difference between a threshold value selected from a set of threshold values and the input pixel value multiplied by a selected enhancement factor. Said selected enhancement factor determines how closely image detail is preserved, and enables, for example, to improve the apparent sharpness of the image. The introduction in the function of a threshold value selected from a set of threshold values contributes to a periodic modulation of the error diffusion threshold level.

With the method disclosed in EP 0544511 A2, it has been noticed that unwanted textures appear in the halftoned image, such as bands in the mid-tones and wavy lines (often called worms) in the highlights and shadows.

SUMMARY OF THE INVENTION

The present invention seeks to provide a method in which the presence of unwanted textures in halftoned images is reduced.

The object of the present invention is accomplished by a method for generating a halftone image comprising output pixels from an input image having input pixels having input pixels values, the method comprising the steps of: for each input pixel, adding a previously determined error term to the input pixel value to obtain a modified input pixel value; determining an error diffusion threshold level based on the input pixel value; applying a quantization operation to the modified input pixel value using the determined error diffusion threshold level for obtaining an output pixel value; and determining an error contribution that is a difference between the output pixel value and the modified input pixel value, wherein the error diffusion threshold level depends on a result of a comparison operation performed between the input pixel value and a threshold value selected from a set of threshold values, the selection of the threshold value being based on the position of the input pixel in the input image.

The method according to the present invention achieves halftone images having a dot arrangement with a broad bandwidth and a uniform dot distribution. In particular, it is observed that the graininess of the halftone image is low and that the image is substantially free of worms. At the same time, a good spatial resolution is obtained in the halftoned images.

In one embodiment of the method according to the present invention, the threshold value is a dither threshold value addressed in a dither matrix according to the row and column addresses of the input pixel in the digital image.

With an error diffusion threshold level having such a dependence, there is an increased probability that the quantizer, using the determined error diffusion threshold level, will return an output pixel value equal to the one that would follow from the result of a comparison operation performed between the input pixel value and a dither threshold value addressed in a dither matrix. Thanks to this increased probability, the unwanted textures, which are obtained with usual error diffusion based halftoning algorithms are strongly reduced. Moreover, since a previously determined error term is added to the input pixel value to obtain a modified input pixel value, the benefit of the error diffusion based algorithm is kept. This means that a good spatial resolution is obtained in the halftoned images. The function that determines the error diffusion threshold level according to this embodiment of the present invention is not simply a periodic function based on the position of the pixel in the image. Said function is also not simply equivalent to the addition of randomized noise to a fixed threshold value.

The object of the present invention is also accomplished by an apparatus for generating a halftone image having output pixels from an input image comprising input pixels having input pixels values, the apparatus comprising: an error diffusion module that adds a previously determined error term to the input pixel value to obtain a modified input pixel value, and determines an error contribution that is a difference between the output pixel value and the modified input pixel value; a threshold calculator that determines an error diffusion threshold level based on the input pixel value; a quantizer that applies a quantization operation to the modified input pixel value using the determined error diffusion threshold level to obtain an output pixel value, wherein the threshold calculator is suited to determine the error diffusion threshold level based on a result of a comparison operation performed between the input pixel value and a threshold value selected from a set of threshold values according to the position of the input pixel in the input image.

The object of the present invention is also accomplished by a computer program product residing on a computer readable medium comprising instructions for causing at least one process unit to perform the method of the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
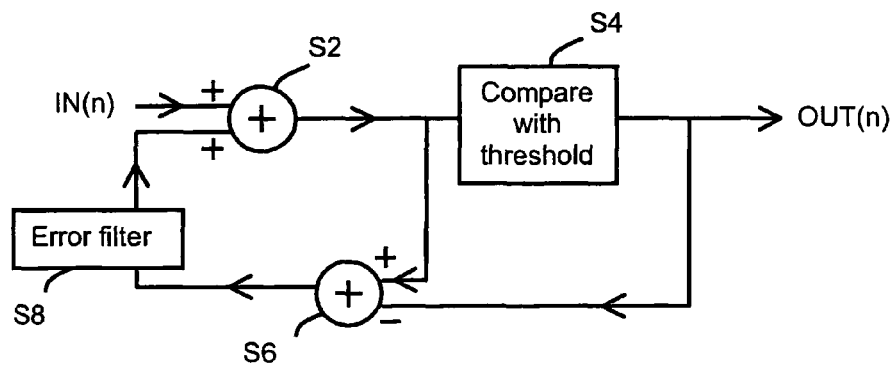
FIG. 1 is a flowchart diagram illustrating the steps of generating a halftone image according to a method of the background art.

The steps of a well-known method of halftoning by error diffusion are represented schematically in the flowchart of FIG. 1. These steps may be performed by a known apparatus for generating a halftoned image comprising an error diffusion module and a quantizer running on a control unit of a printing apparatus. According to the known method, in a first step S2, an error term is added to an input pixel value IN(n) of an input pixel forming part of an input image such that a modified input pixel value is obtained. The error term is a weighted sum of error values of previous pixels to be directed to the input pixel n. Said first step S2 is executed by the error diffusion module. In a second step S4, the modified input pixel value is compared against a threshold so as to determine what output pixel value OUT(n) should be obtained. For example, in the case that halftoning is carried out for the purpose of printing on a binary printer, the threshold level may be half of the intensity range, with an output pixel value being 1 if the modified input pixel value exceeds the threshold level and with an output pixel value being 0 if the modified input pixel value does not exceed the threshold level. In the case of a binary printer, an output value equal to 1 means that the printer outputs a dot at the corresponding position on the print medium (pixel 'ON'), while an output pixel value equal to 0 refers to the absence of dot (pixel 'OFF'). Said second step S4 is executed by the quantizer. In a third step S6, the error value between the output pixel value and the modified input pixel value is calculated by the error diffusion module. In a fourth step S8, the error value is diffused to adjacent pixels using predetermined weighting factors (error filter), so that predetermined proportions of the error are added to the input pixel value of adjacent pixels. Weighting factors as taught, for example, in "An Adaptive Algorithm for Spatial Greyscale" by Floyd and Steinberg in Proceeding of the SiD, vol. 17/2, 75-77 (1976) may be used. Proportions of error values are accumulated by the error diffusion module such that an error term to be added in step S2 to an input pixel value is obtained for a next pixel to be processed. Processing then continues with a next input pixel in a predetermined scan direction, and a corresponding output pixel value is obtained.

Figure 2:
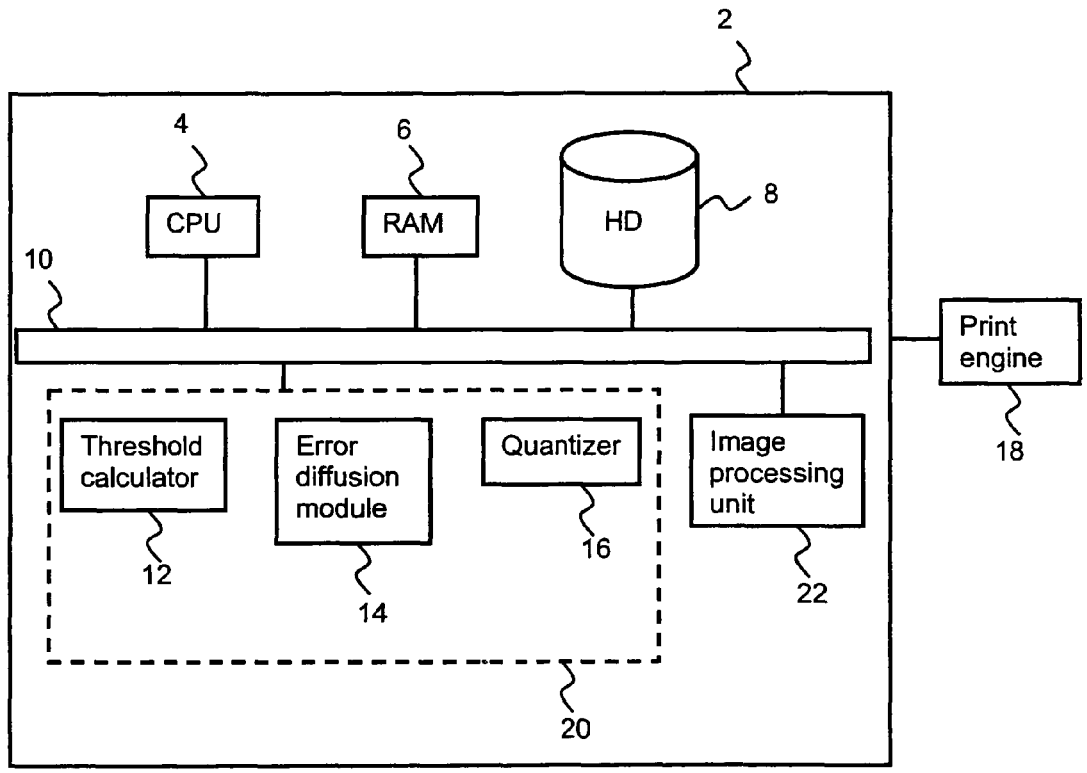
FIG. 2 is a schematic diagram of an apparatus for generating a multilevel halftone image according to an embodiment of the present invention.

FIG. 2 is a schematic diagram of an apparatus 2 for generating a multilevel halftone image according to an embodiment of the present invention. The apparatus 2 comprises a Central Processing Unit (CPU) 4, a Random Access Memory (RAM) 6, a data storage device such as a hard disk (HD) 8, an image processing unit 22 and a halftone unit 20. The aforementioned units are interconnected through a bus system 10. The apparatus 2 may be connected to a print engine 18 suited to print the halftoned images. The print engine 18 may use a variety of different technologies to transfer colorant on a print media, including inkjet, thermal dye transfer, etc. In another embodiment of the present invention, the image-processing unit 22 is not included in the apparatus 2 for generating a multilevel halftone image. The apparatus 2 for generating a multilevel halftone image may be implemented on a control unit of a printing apparatus and the image-processing unit 22 may be implemented on a distinct host computer.

The CPU 4 controls the respective units of the apparatus 2 in accordance with control programs stored on the hard disk 8, such as computer programs required to execute processes shown in a flowchart to be described later.

The hard disk 8 is an example of a storage device that stores digital images. The data stored on the HD 8 are read out onto the RAM 6 by the CPU 4 as needed. This may be the case when an input digital image stored on the hard disk is to be halftoned according to the method of the present invention. After halftoning, data of the halftoned image are read out from the RAM by the CPU and may be written onto the hard disk or be passed directly to the print engine for printing.

The RAM 6 has an area for temporarily storing programs and data such as image data, which are read out from the memory means 8 by the CPU 4, and also a work area, which is used by the CPU 4 to execute various processes.

The image-processing unit 22 is suited to convert a source image into a pixel-mapped image or bitmap. The source image may be raster image data obtained from a scanner or a computer application, or image data in the form of a page description language (PDL) or the like. The image-processing unit 22 may be a raster image processor (RIP). The pixel-mapped image obtained from the image-processing unit 22 is hereinafter referred to as input image data, forming an image comprising input pixels to be halftoned.

The halftone unit 20 comprises a threshold calculator 12, an error diffusion module 14 and a quantizer 16 that may be implemented either as a software component of an operating system running on the apparatus 2 or as a firmware program executed on the CPU 4. The halftone unit is suited for converting input image data into halftone image data, which can be output to the print engine 18. A control unit placed inside the print engine 18 ensures that dots are placed on a recording medium by a printhead in accordance with the halftoned image data.

Figure 3:
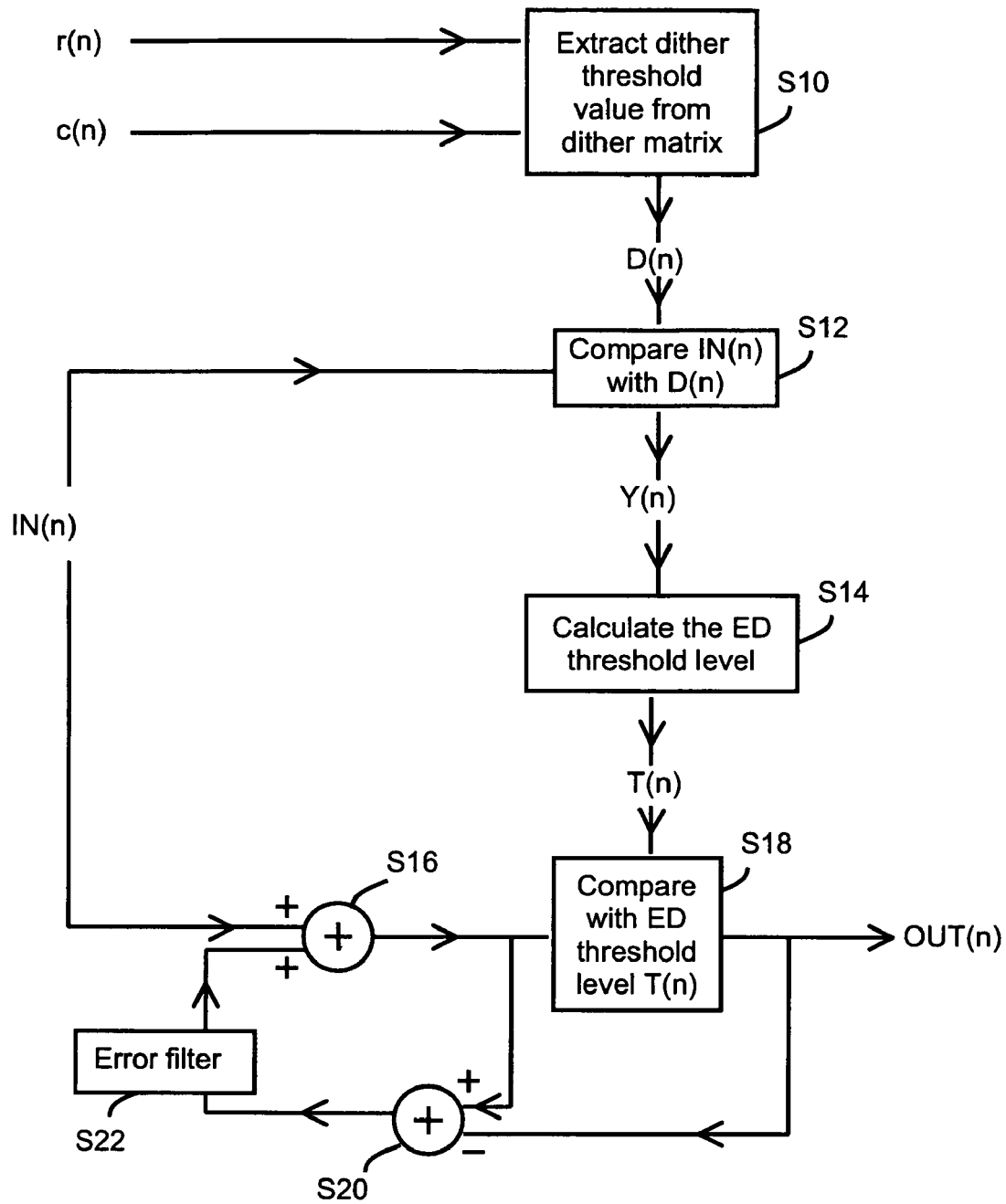
FIG. 3 is a flowchart diagram illustrating the steps of generating a halftone image according to an embodiment of the present invention.

The threshold calculator 12, the error diffusion module 14 and the quantizer 16 according to an embodiment of the present invention perform tasks which are described hereinafter, wherein reference is made to FIG. 3. The method for generating a halftone image according to an embodiment of the present invention comprises the steps shown in FIG. 3.

Let n be an input pixel of a input bitmap image to be halftoned, having an input pixel value equal to IN(n) being in the present example an integer between 0 and 255. The input pixel n has row and column addresses in the bitmap image equal to, respectively r(n) and c(n). In step S10, a sub-part of an algorithm executed by the threshold calculator 12 extracts a dither threshold value from a dither matrix. The matrix contains threshold values between 0 and 255. The extracted value depends on the row and column addresses of the pixel n. Since most of the time, the size of the image is larger than the size of the matrix, the matrix is tiled over the image in order to extract the dither threshold value. The threshold values D(n) are thus addressed periodically in the dither matrix, which is an example of a set of threshold values. The period at which the threshold values are addressed corresponds to the size of the dither matrix, i.e. the number of threshold values therein. For example, if the dither matrix has a 8×8 structure, it contains 64 threshold values. The dither matrix, preferably an ordered dithering matrix, contains in the present example threshold values between 0 and 255. The extracted value D(n) is thus an integer between 0 and 255.

In step S12, another sub-part of an algorithm executed by the threshold calculator 12 compares the input pixel value IN(n) to the previously extracted dither threshold value D(n). If the input pixel value is above the extracted dither threshold value, the result Y(n) of the comparison takes the value 1. If the input pixel value is equal to or below the extracted dither threshold value, the result Y(n) of the comparison operation takes the value 0. Clearly, the result Y(n) of the comparison operation is dependent on the input pixel value and on the extracted dither threshold value, which itself depends on the position of the input pixel in the input image.

In step S14, yet another sub-part of an algorithm executed by the threshold calculator 12 calculates an error diffusion threshold level T(n), taking into account the value of Y(n), which is the result of the comparison operation of step S12. For example, the function for determining the error diffusion threshold level T(n) may be expressed by the following relation:

$$T(n) = T_0 - R \times \frac{(2 \times Y(n) - 1)}{K} \quad (1)$$

whereby R is a constant that represents the intensity range (for example 256), $T_0$ is a constant that represents a fixed threshold level, for example 128, i.e. the half of the intensity range R, and K is a factor between 1 and 5, preferably 3.

The error diffusion threshold level T(n) depends on the result Y(n) of the comparison operation performed in step S12, which is the comparison between the input pixel value IN(n) and the dither threshold value D(n) addressed in a dither matrix according to the row and column addresses r(n) and c(n) of the pixel n. In the example, with the maximum range intensity R equal to 256, with $T_0$ equal to 128 and the factor K equal to 3, if Y(n) is equal to 1, the error diffusion level T(n) is equal to $T_0$ minus a third of the maximum range intensity R, i.e. T(n) is equal to 43. On the other hand, if Y(n) is equal to 0, the error diffusion level T(n) is equal to $T_0$ plus a third of the maximum range intensity R, i.e. T(n) is equal to 213. Compared to the known algorithm represented in FIG. 1, wherein the threshold level $T_0$ is fixed, the error diffusion threshold level is now adjusted based on the result of the comparison between the input pixel value and the dither threshold value addressed in the dither matrix according to the row and column addresses of the input pixel in the digital image.

In step S16, a previously determined error term is added to the input pixel value IN(n) such that a modified input pixel value is obtained.

In step S18, the modified input pixel value is compared to the error diffusion level T(n) obtained in step S14. In step S18, the output pixel value OUT(n) is obtained. OUT(n) takes the value 1 if the modified input pixel value exceeds T(n). OUT(n) takes the value 0 if the modified input pixel value does not exceed T(n).

In step S20, the error between the output pixel value and the modified input pixel value is calculated.

In step S22, the error is diffused to adjacent pixels using predetermined weighting factors as taught, for example, by Floyd and Steinberg.

In the example above, it appears that the value of the error diffusion threshold value is a decreasing function of Y(n), which represents the result of the comparison operation performed in step S12. Step S12 is a comparison between the input pixel value IN(n) and the dither threshold value D(n) addressed in a dither matrix according to the row and column addresses r(n) and c(n) of the pixel n. In the situation where the result of the comparison in step S12 is represented by one, the error diffusion threshold level is equal to the fixed threshold level $T_0$ minus a fraction K of the maximum intensity range. On the other hand, in the situation where the result of the comparison in step S12 is represented by zero, the error diffusion threshold level is equal to the fixed threshold level $T_0$ plus a fraction K of the maximum intensity range.

An effect as described hereinafter is achieved. Clearly, the method of halftoning according to the present invention does not systematically give the same output pixel value as a purely ordered dither method would. This simply arises from the fact that the result Y(n) of the comparison operation performed in step S12 is not systematically equal to the output pixel value OUT(n) obtained by the halftoning method according to the present invention. However, with the present invention, the probability that an output pixel will be turned 'OFF' or 'ON' is influenced by the result that a simple ordered dither method would have. In the situation that an output pixel would be 'OFF' with a purely ordered dither method, the probability that the halftone method according to the present invention will output a pixel 'OFF' is increased compared to the error diffusion according to the background art that is represented in FIG. 1. This is a consequence of the fact that the error diffusion threshold level T(n) is increased compared to $T_0$ when Y(n) is equal to zero. On the other hand, if an output pixel were 'ON' with a purely ordered dither method, the probability that the halftone method according to the present invention will output a pixel 'ON' is increased compared to the error diffusion according to the background art that is represented in FIG. 1. This arises from the fact that the error diffusion threshold level T(n) is decreased with respect to $T_0$ when Y(n) is equal to one. In other words, the result of the comparison performed in step S12 is a significant incentive for the quantizer module 16 to turn a pixel ON or OFF in the case where a purely ordered dither would be sufficient. The significant incentive is simply expressed by the fact that the probability that the quantizer outputs a pixel ON or OFF is accordingly increased.

While the embodiment described above has been illustrated for a halftoning method that is suited for a binary output printer, it is clearly also suited for a multilevel printer with more than two output levels (L>2). In such printers, intermediate levels between an 'ON' pixel and an 'OFF' pixel are obtained with techniques such as dot size modulation.

A known multilevel halftoning algorithm based on error diffusion only, and suited for a printer having L output levels, has a quantizer for comparing the modified input pixel value against (L−1) threshold values. For example, for a printer with 4 output levels (0; 1/3; 2/3; 1), and with an input range between 0 and 255, it is possible to define 3 fixed threshold levels, for example $T_1=63$, $T_2=127$, and $T_3=191$. The output pixel value as a function of the modified input pixel value is given by the following table, according to a background art method.

| Range of modified input pixel value | 0 to 63 | 64 to 127 | 128 to 191 | 192 to 255 |
|---|---|---|---|---|
| Output pixel value | 0 | 1/3 | 2/3 | 1 |

In an embodiment of the halftoning method of the present invention, which is suited for a multilevel printer with L output levels (L>2), the number of possible values for Y(n), which is the result of the comparison carried out in step S12, remains two. This means that Y(n) could take the value one or zero, depending on the input pixel value and on the extracted dither threshold value. Each of the (L−1) fixed error diffusion threshold levels is adjusted in step S14 based on Y(n), by which an error diffusion threshold level T(n) is obtained. For example, in the case that the (L−1) fixed error diffusion threshold levels are T1, T2, and T3, they are adjusted according to the following relations:

$$T_1(n) = T_1 - \frac{R}{2L} \times \frac{(2 \times Y(n) - 1)}{K} \quad (2)$$

$$T_2(n) = T_2 - \frac{R}{2L} \times \frac{(2 \times Y(n) - 1)}{K} \quad (3)$$

$$T_3(n) = T_3 - \frac{R}{2L} \times \frac{(2 \times Y(n) - 1)}{K} \quad (4)$$

whereby R is a constant that represents the intensity range (for example 256), $T_1$, $T_2$, and $T_3$ are constants which represent fixed threshold levels, K is a factor between 1 and 5, and L is the number of possible output levels. Y(n) takes the value one or zero, depending on the result obtained in step S12.

Figure 4A:
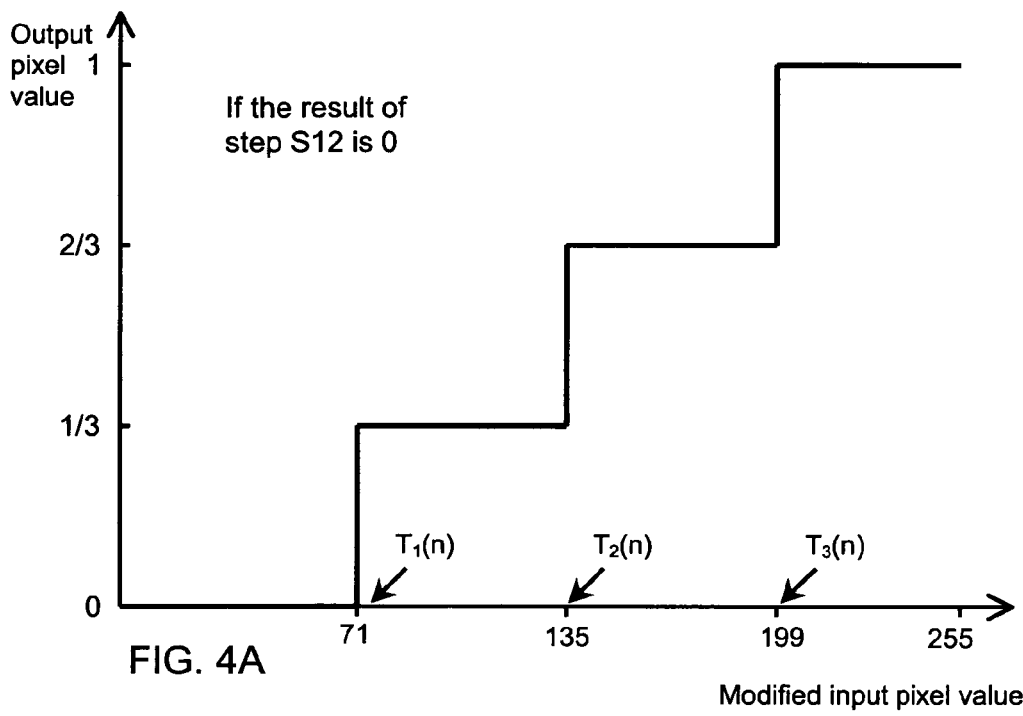
FIGS. 4A and 4B are graphics representing the output pixel value as a function of the modified input pixel value, obtained by the application of an algorithm according to an embodiment of the present invention.
Figure 4B:
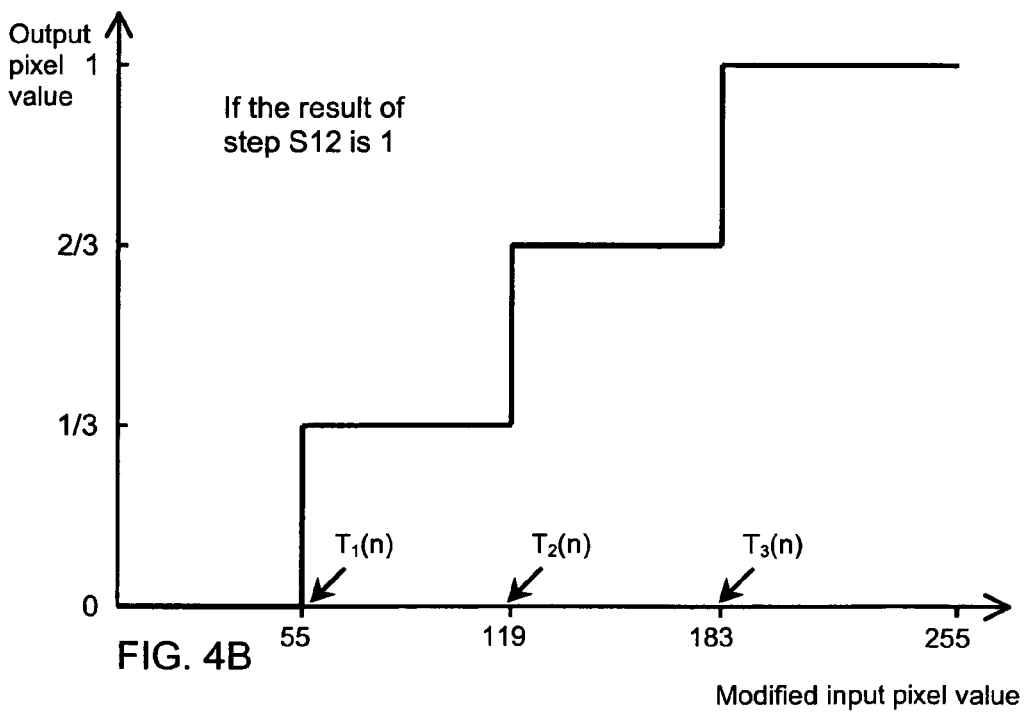

FIGS. 4A and 4B illustrate the behavior of the output pixel value as a function of the modified input pixel value, obtained by the method according to the present invention, in a first case (FIG. 4A) wherein Y(n), the result of the comparison operation of step S12 is zero and in a second case wherein Y(n) is one. The following parameters are considered: R=256; L=4; K=4; $T_1$=63, $T_2$=127, and $T_3$=191. As seen in FIGS. 4A and 4B, the error diffusion threshold values $T_1(n)$, $T_2(n)$ and $T_3(n)$ are not simply modulated as a function of the row and column address of the input pixel in the image. Also the value of the input pixel has an influence, since it drives the value of Y(n), which is the result of the comparison in step S12.

The method according to the present invention leads to halftoned images having a broad spatial bandwidth and a pleasant dot placement. Tests have been performed with an algorithm based on the equation (1) for step S14, with R=256, $T_0$=127 and K=3, for an input image comprising uniform grey patches. The dither matrix used in step S10 was an ordered dither matrix with a dimension 256×256. The obtained halftoned images have been printed on a binary printer and present a pleasant visual aspect. In particular, in the very light areas, it is noticed that the defects of the type 'worms' are much less than with an error diffusion based halftoning algorithm according to the background art. Moreover, in the middle tones, the coarse noise pattern defects, which are typical of the error diffusion according to the background art, are absent. In addition, the graininess is strongly reduced when compared to results obtained by halftoning based on ordered dither only.

In tests performed on input images containing thin lines, it is noticed that even thin lines are rendered properly, while they tend to disappear when a pure ordered dither is used. In other tests performed on photographic images, it is observed that mid-tones areas are not spoiled by noise coarse patterns that are typical of error diffusion according to the background art, while all details are sharp enough to the eye.

Figure 5:
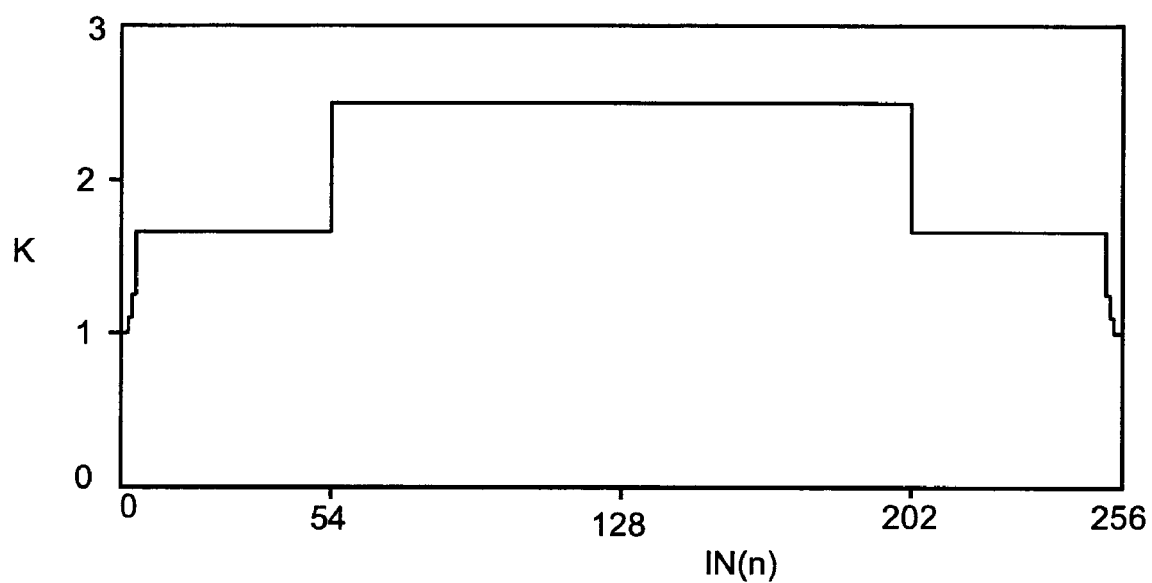
FIG. 5 is a graphic representing the variation of the factor K as a function of the input pixel value.

The factor K may take a value that depends on the input pixel value. A function giving K(IN(n)) is illustrated as an example in FIG. 5.

The method for halftoning images according to the present invention is also suited for color input images. The halftoning algorithms are applied to each of the independent color planes, as described above. The improvements that have been noticed for grey-scale images are also noticed for color images.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for generating a halftone image having output pixels from an input image comprising input pixels having input pixel values, said method comprising the steps of:
   for each input pixel, adding an error term to the input pixel value in a halftone unit to obtain a modified input pixel value, wherein the error term is a weighted sum of error values of previous pixels to be directed to the input pixel;
   determining an error diffusion threshold level based on the input pixel value;
   applying a quantization operation to the modified input pixel value using the determined error diffusion threshold level for obtaining an output pixel value; and
   determining an error value of the input pixel that is a difference between the output pixel value and the modified input pixel value,
   wherein the error diffusion threshold level depends on a result of a comparison operation performed between the input pixel value and a threshold value selected from a set of threshold values, the selection of the threshold value being based on the position of the input pixel in the input image.

2. The method for generating a halftone image according to claim 1, wherein the threshold value is addressed periodically according to a period in the set of threshold values according to the position of the input pixel in the input image, the period representing the number of threshold values in the set.

3. The method for generating a halftone image according to claim 1, wherein the threshold value is a dither threshold value addressed in a dither matrix according to the row and column addresses of the input pixel in the digital image.

4. The method for generating a halftone image according to claim 3, wherein the dither matrix is an ordered dither matrix.

5. The method for generating a halftone image according to claim 3, wherein the error diffusion threshold level is determined according to a function that decreases as a function of the result of the comparison operation performed between the input pixel value and the selected dither threshold value.

6. The method for generating a halftone image according to claim 4, wherein the error diffusion threshold level is determined according to a function that decreases as a function of the result of the comparison operation performed between the input pixel value and the selected dither threshold value.

7. An apparatus for generating a halftone image having output pixels from an input image comprising input pixels having input pixels values, said apparatus comprising:

an error diffusion module that adds an error term to the input pixel value to obtain a modified input pixel value, wherein the error term is a weighted sum of error values of previous pixels to be directed to the input pixel, and determines an error value of the input pixel that is a difference between the output pixel value and the modified input pixel value;

a threshold calculator that determines an error diffusion threshold level based on the input pixel value; and a quantizer that applies a quantization operation to the modified input pixel value using the determined error diffusion threshold level to obtain an output pixel value, wherein the threshold calculator is suited to determine the error diffusion threshold level based on a result of a comparison operation performed between the input pixel value and a threshold value selected from a set of threshold values according to the position of the input pixel in the input image.

8. The apparatus for generating a halftone image according to claim 7, wherein the threshold value is a dither threshold value addressed in a dither matrix according to the row and column addresses of the input pixel in the digital image.

9. A computer program product residing on a nontransitory computer readable recording medium comprising instructions for causing at least one process unit to perform a method for generating a halftone image having output pixels from an input image comprising input pixels having input pixels values, said method comprising the steps of:

for each input pixel, adding an error term to the input pixel value to obtain a modified input pixel value, wherein the error term is a weighted sum of error values of previous pixels to be directed to the input pixel;

determining an error diffusion threshold level based on the input pixel value;

applying a quantization operation to the modified input pixel value using the determined error diffusion threshold level for obtaining an output pixel value; and determining an error value of the input pixel that is a difference between the output pixel value and the modified input pixel value, wherein the error diffusion threshold level depends on a result of a comparison operation performed between the input pixel value and a threshold value selected from a set of threshold values, the selection of the threshold value being based on the position of the input pixel in the input image.

10. The computer program product according to claim 9, wherein the threshold value is addressed periodically according to a period in the set of threshold values according to the position of the input pixel in the input image, the period representing the number of threshold values in the set.

11. The computer program product according to claim 9, wherein the threshold value is a dither threshold value addressed in a dither matrix according to the row and column addresses of the input pixel in the digital image.

12. The computer program product according to claim 11, wherein the dither matrix is an ordered dither matrix.

13. The computer program product according to claim 11, wherein the error diffusion threshold level is determined according to a function that decreases as a function of the result of the comparison operation performed between the input pixel value and the selected dither threshold value.

14. The computer program product according to claim 12, wherein the error diffusion threshold level is determined according to a function that decreases as a function of the result of the comparison operation performed between the input pixel value and the selected dither threshold value.

* * * * *